US011078951B2

(12) United States Patent
Jiang et al.

(10) Patent No.: US 11,078,951 B2
(45) Date of Patent: Aug. 3, 2021

(54) LOCKING ASSEMBLY FOR ROTATABLE COMPONENTS

(71) Applicant: Hamilton Sundstrand Corporation, Charlotte, NC (US)

(72) Inventors: Yiwei Jiang, Rockford, IL (US); Michael R. Blewett, Stillman Valley, IL (US); Edward W. Goy, Crystal Lake, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 275 days.

(21) Appl. No.: 16/416,830

(22) Filed: May 20, 2019

(65) Prior Publication Data

US 2020/0370591 A1 Nov. 26, 2020

(51) Int. Cl.
*F16B 39/12* (2006.01)
*F16B 39/16* (2006.01)
*F01D 25/28* (2006.01)
*F16B 41/00* (2006.01)

(52) U.S. Cl.
CPC ............. *F16B 39/16* (2013.01); *F01D 25/28* (2013.01); *F16B 41/002* (2013.01)

(58) Field of Classification Search
USPC .................................. 411/214, 215, 271, 325
See application file for complete search history.

(56) References Cited

U.S. PATENT DOCUMENTS

| 1,420,737 | A | | 6/1922 | Palmgren | |
| 2,391,232 | A | * | 12/1945 | Farrell | F16B 39/16 411/244 |
| 2,843,311 | A | * | 7/1958 | Buchi | F01D 5/025 416/171 |
| 3,181,902 | A | * | 5/1965 | Aitken | F16H 57/0025 403/258 |

(Continued)

FOREIGN PATENT DOCUMENTS

| EP | 3354883 | 8/2018 |
| JP | S6122928 | 2/1986 |

OTHER PUBLICATIONS

European Search Report for European Patent Application No. 19208988.6 completed Jun. 22, 2020.

*Primary Examiner* — Gary W Estremsky
(74) *Attorney, Agent, or Firm* — Carlson, Gaskey & Olds, P.C.

(57) ABSTRACT

An assembly for a coupling together rotatable components according to an example of the present disclosure includes, among other things, a rotor shaft extending along a centerline axis, the rotor shaft defining an inner bore extending from an axial end of the rotor shaft, a gear mounted on an outer diameter of the rotor shaft, a lock nut threadedly engaged with the outer diameter of the rotor shaft such that the lock nut abuts against an axial end face of the gear, and a retainer including a step portion extending from a head portion and including a projection portion extending from the step portion. The projection portion is insertable into the inner bore to bias the lock nut against the axial end face of (Continued)

the gear, and the step portion is dimensioned to establish an interference fit with the rotor shaft along the inner bore. A starter assembly and a method of assembly are also disclosed.

20 Claims, 8 Drawing Sheets

(56) References Cited

U.S. PATENT DOCUMENTS

| | | | | |
|---|---|---|---|---|
| 3,424,019 A * | 1/1969 | Karl-Heinz | ............. | F16D 1/096 474/113 |
| 3,776,651 A * | 12/1973 | Peter | ......................... | F16D 1/09 403/248 |
| 3,884,091 A * | 5/1975 | Hay | ......................... | B62D 3/10 74/499 |
| 4,022,536 A * | 5/1977 | Piepho | .................... | E02F 9/006 403/16 |
| 4,142,765 A | 3/1979 | Olsaker | | |
| 4,411,549 A * | 10/1983 | Sheppard | ............. | F16B 31/025 403/258 |
| 4,668,116 A * | 5/1987 | Ito | .......................... | F16D 1/095 403/258 |
| 4,778,303 A * | 10/1988 | Mullins | .................. | F16D 1/108 403/11 |
| 4,874,275 A * | 10/1989 | Gotman | ................ | F16B 31/021 411/5 |
| 4,966,474 A | 10/1990 | Geiger | | |
| 5,052,891 A * | 10/1991 | Burkholder | ............. | F01D 5/066 416/198 A |
| 5,308,183 A * | 5/1994 | Stegeman | ............... | F16D 1/096 403/259 |
| 5,722,163 A | 3/1998 | Grant et al. | | |
| 5,988,965 A | 11/1999 | Fiorell et al. | | |
| 8,113,754 B2 | 2/2012 | Dahl et al. | | |
| 9,212,556 B2 | 12/2015 | Lucas et al. | | |
| 2007/0292263 A1 | 12/2007 | Giesler | | |
| 2012/0042659 A1 | 2/2012 | Zawilinski | | |

* cited by examiner

LOCKING ASSEMBLY FOR ROTATABLE COMPONENTS

BACKGROUND

This application relates to locking assemblies that may be utilized to secure components such as a rotatable shaft coupled to an air turbine starter.

Air turbine starters are known, and include a turbine rotor which receives compressed air from a source to drive the turbine rotor. The turbine rotor may be coupled to an auxiliary gearbox through a gear system. Rotation of the turbine rotor causes an input of the gear system to rotate, which causes rotation of an output shaft coupled to an output of the gear system. The auxiliary gearbox interconnects the output shaft and a prime mover, such as a gas turbine engine in an aircraft, and the turbine rotor is utilized as a starter to begin rotation of the gas turbine engine core.

The rotor shaft receives a sun gear of the gear system. The sun gear may be retained to the rotor shaft utilizing one or more fasteners.

SUMMARY

An assembly for a coupling together rotatable components, according to an example of the present disclosure, includes a rotor shaft extending along a centerline axis, the rotor shaft defining an inner bore extending from an axial end of the rotor shaft, a gear mounted on an outer diameter of the rotor shaft, a lock nut threadedly engaged with the outer diameter of the rotor shaft such that the lock nut abuts against an axial end face of the gear, and a retainer including a step portion extending from a head portion and including a projection portion extending from the step portion. The projection portion is insertable into the inner bore to bias the lock nut against the axial end face of the gear, and the step portion is dimensioned to establish an interference fit with the rotor shaft along the inner bore.

The various features and advantages of this disclosure will become apparent to those skilled in the art from the following detailed description. The drawings that accompany the detailed description can be briefly described as follows.

DETAILED DESCRIPTION

Figure 1:
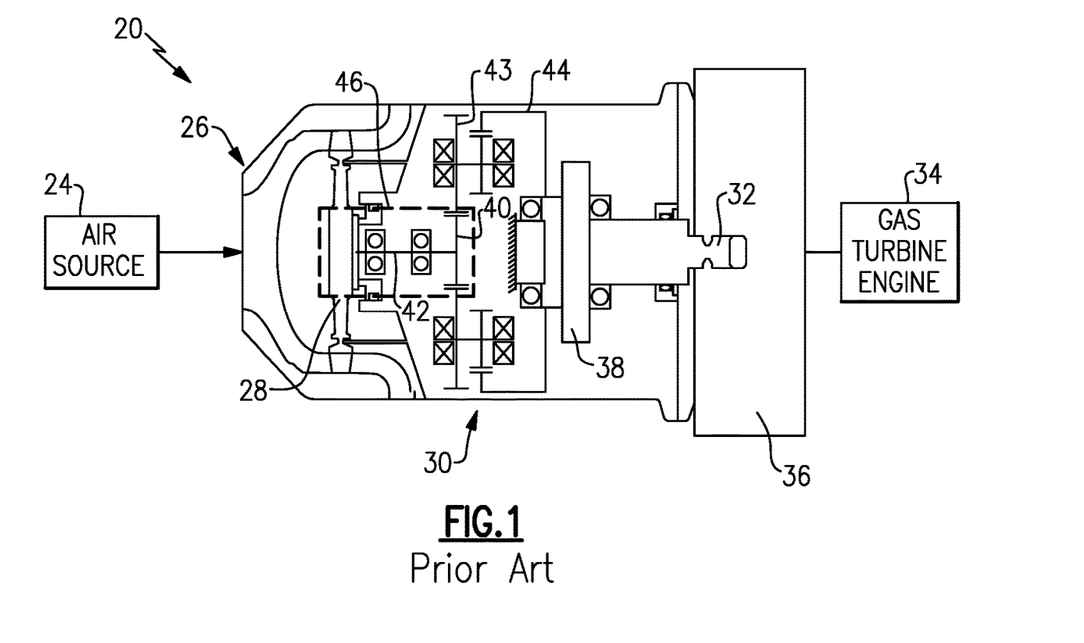
FIG. 1 schematically illustrates a starter assembly for a gas turbine engine.

FIG. 1 schematically illustrates a starter assembly 20 including an air turbine starter for a gas turbine engine 34. An air source 24 delivers high pressure air into an inlet 26. The high pressure air flows across a turbine rotor 28, causing the turbine rotor 28 to rotate. As the turbine rotor 28 rotates, it rotates the output shaft 32 via an epicyclic gear system 30. The output shaft 32 may be utilized as an engine starter in some examples, to start operation of a prime mover such as a main gas turbine engine 34. In some examples, as shown, the output shaft 32 drives a spool of the gas turbine engine 34 through an accessory gearbox 36. A clutch 38 can be provided between the gear system 30 and the output shaft 32, or an output of the gear system 30 can be directly coupled to the output shaft 32.

The gear system 30 is a star gear system including a sun gear 40 that is driven by a rotor shaft 42 and rotates with the turbine rotor 28. The gear system 30 includes a plurality of intermediate gears 43 that mesh with the sun gear 40 and a ring gear 44. The gear system 30 interconnects the rotor shaft 42 and output shaft 32. During an engine start operation, the sun gear 40 drives the intermediate gears 43, which drive the ring gear 44. The ring gear 44 drives the output shaft 32 and the accessory gearbox 36 through the clutch 38 in response to rotation of the rotor shaft 42.

Figure 2:
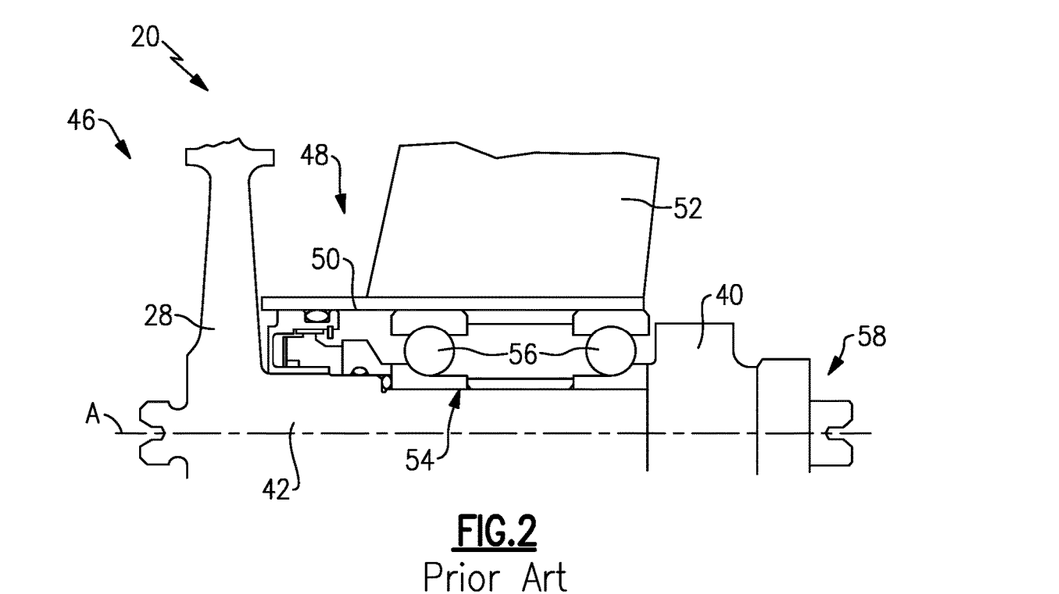
FIG. 2 illustrates a partial section of the starter assembly of FIG. 1.

FIG. 2 illustrates a turbine assembly section 46 of the starter assembly 20 shown in FIG. 1. The turbine rotor 28 is rotatable with the rotor shaft 42 about a centerline axis A. A stator section 48 is provided axially aft (downstream with respect to the working fluid) of the rotor 28. The stator section 48 includes a hub 50 and a gear cage housing 52 radially outward of the hub 50. Alternatively or additionally, the stator section 48 may include other stationary components of the starter assembly 20.

A bearing assembly 54 is provided radially between the rotor shaft 42 and the hub 50 and includes one or more ball bearings 56. The bearing assembly 54 is received on the rotor shaft 42 axially between the sun gear 40 and the turbine rotor 28 relative to the centerline axis A. The inner races of the ball bearings 56 rotate with the rotor shaft 42, while the outer races of the ball bearings 56 are static and support the hub 50. The sun gear 40 is provided axially aft of the aft-most ball bearing 56.

A locking assembly 58 is provided axially aft of the sun gear 40 to clamp the sun gear 40 and the bearing assembly 54 to the rotor shaft 42 to achieve desired compression and balancing. Prior art locking assemblies may include customized nuts, which may be expensive and require long assembly times, often requiring shims and/or other additional components for installation.

Figure 3:
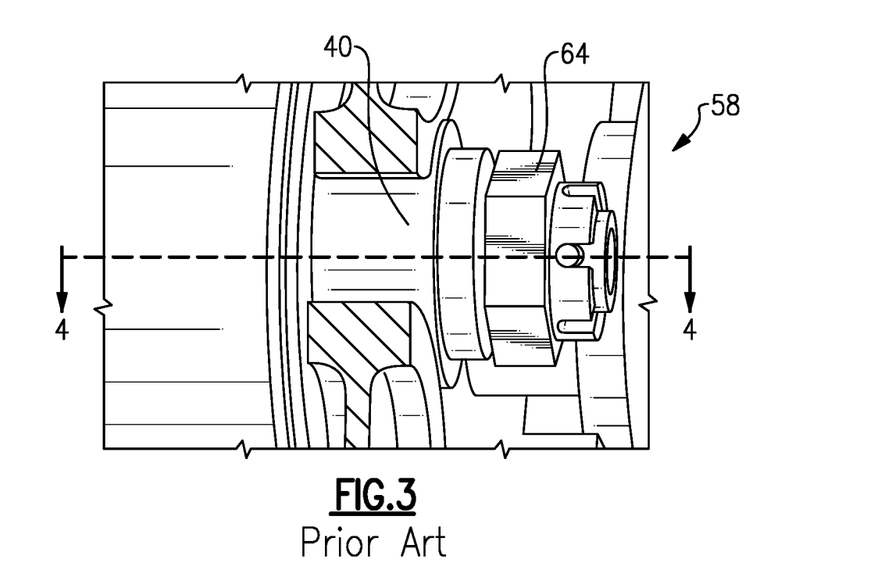
FIG. 3 illustrates a prior art locking assembly.
Figure 4:
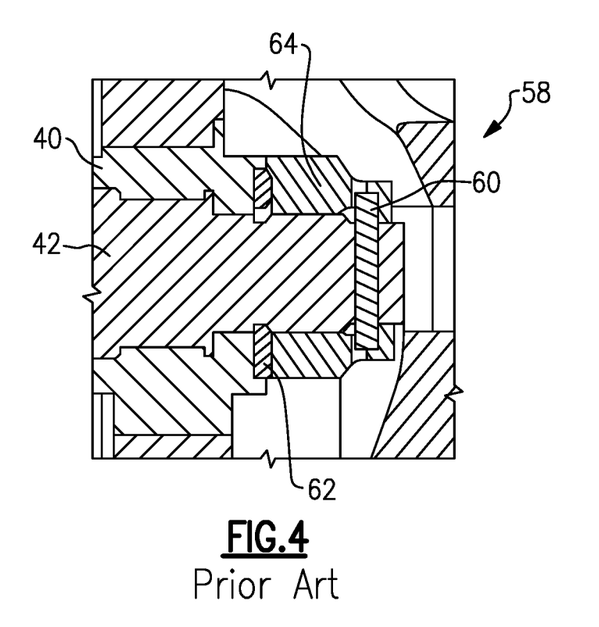
FIG. 4 illustrates a cross sectional view of the locking assembly taken along line 4-4 of FIG. 3.

FIG. 3 illustrates prior art locking assembly 58 including a castellated nut 64 positioned to clamp the sun gear 40. FIG. 4 illustrates a cross-sectional view of the locking assembly 58 illustrated in FIG. 3. Referring to FIG. 4, the castellated nut 64 is aligned with openings in the rotor shaft 42, and a pin 60 is placed through the castellated portion (grooves or slots in upper face) of the nut 64 and into openings in the rotor shaft 42. A shim 62 is then placed to fill any gap between the nut 64 and the sun gear 40 to achieve the desired compression.

In another prior art locking assembly (not shown), a customized nut is fastened to the rotor shaft against the sun gear and receives a ring having geometrical aspect to interface with a corresponding surfaces on the rotor shaft and nut for positive locking of the nut onto the rotor shaft.

FIGS. 5-8 illustrate an exemplary locking assembly 158 for a coupling together components, such as fixed components and/or rotational components of a starter assembly for a gas turbine engine. In this disclosure, like reference numerals designate like elements where appropriate and reference numerals with the addition of one-hundred or multiples thereof designate modified elements that are understood to incorporate the same features and benefits of the corresponding original elements. The locking assembly 158 can be incorporated into the starter assembly 20 of FIGS. 1-2, and the components can include the rotor shaft 42, bearing assembly 54 and sun gear 40 of the gear system 30 of FIGS. 1-2, for example. Other example components can include a drive shaft coupled to a rotatable hub, and components fixed to a static structure. Other gear and shaft arrangements and other rotating machines may benefit from the teachings of this disclosure.

Figure 5:
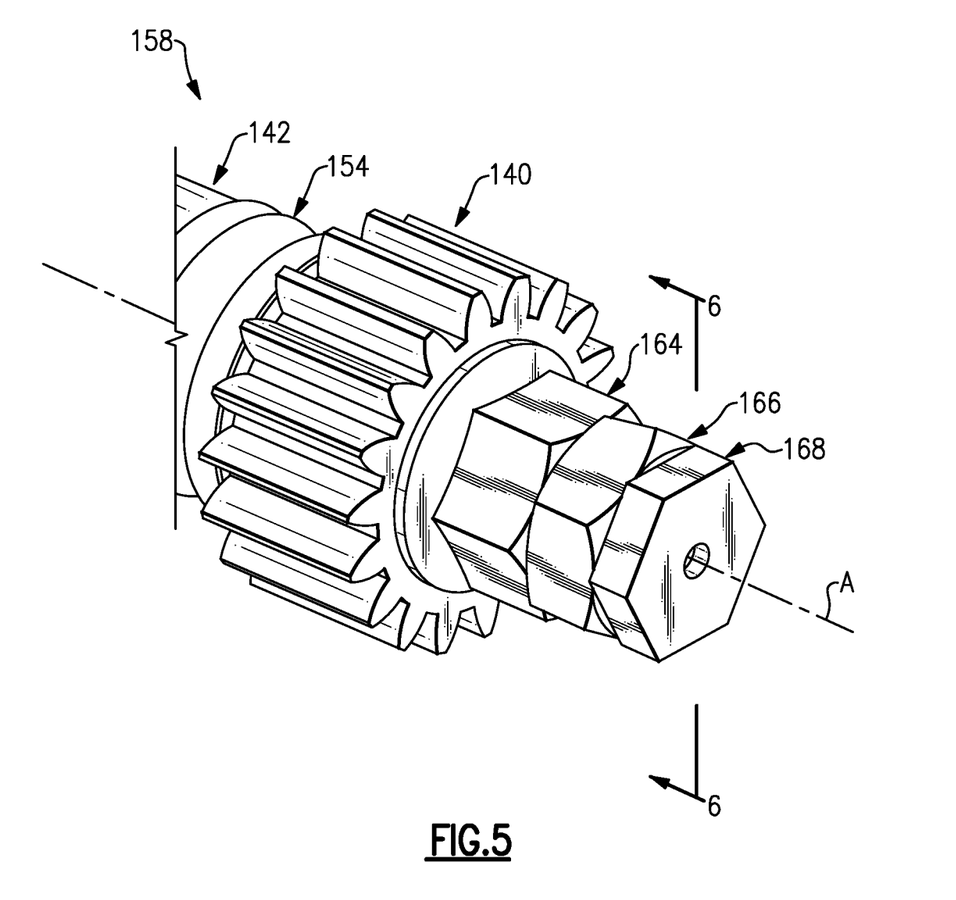
FIG. 5 illustrates a perspective view of an example locking assembly.

Referring to FIG. 5, the locking assembly 158 includes a lock nut 164, spacer 166 and retainer 168 that cooperate to clamp, mechanically attach or otherwise secure a gear 140 and a bearing assembly 154 to a rotor shaft 142. The clamping action of the retainer 168 reduce a likelihood of the lock nut 164 loosening during operation. The rotor shaft 142, bearing assembly 154, lock nut 164, spacer 166 and retainer 168 are separate and distinct components that are mechanically attached utilizing the techniques disclosed herein. The rotor shaft 142 extends along a centerline axis A. The lock nut 164 can be an off-the-shelf component or customized according to design criteria.

In examples, the gear 140 is a sun gear that meshes with a plurality of intermediate gears of an epicyclic gear system comprising a sun gear, such as the sun gear 40 and intermediate gears 43 of the gear system 30 in FIG. 1. In other examples, the gear 140 is a sun gear incorporated into a planetary gear system in which the ring gear is fixed to a static structure and the intermediate gears drive an output shaft through a carrier.

Figure 6:
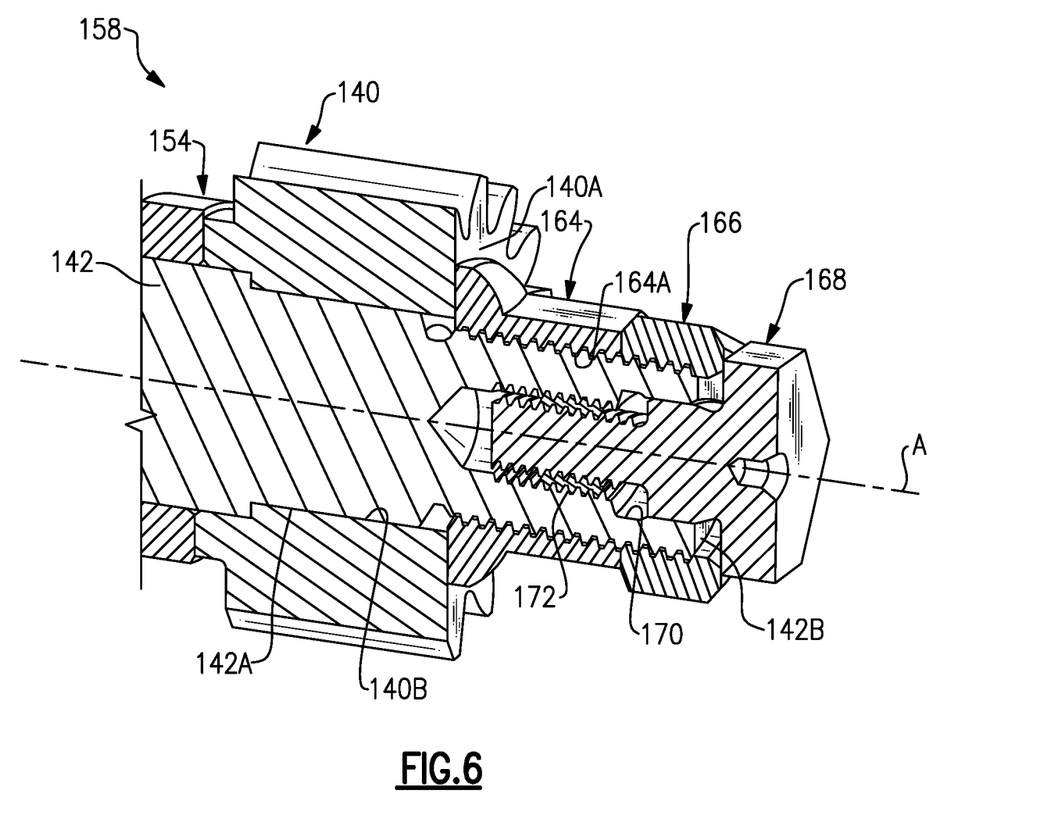
FIG. 6 illustrates a sectional view of the locking assembly taken along line 6-6 of FIG. 5.
Figure 6A:
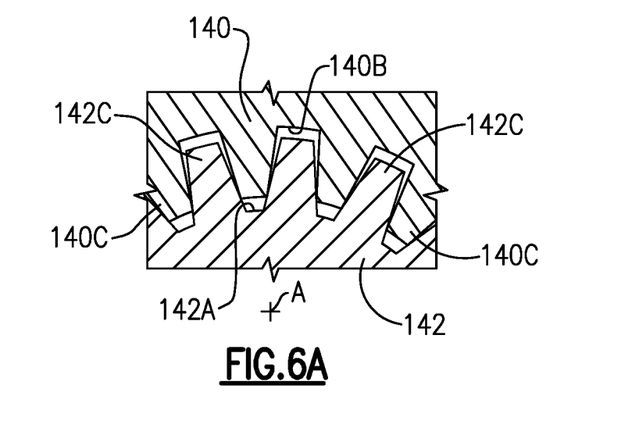
FIG. 6A illustrates a splined interface.

Referring to FIG. 6, with continuing reference to FIG. 5, the gear 140 is mounted on an outer diameter 142A of the rotor shaft 142. An inner diameter 164A of the lock nut 164 is threadedly engaged with the outer diameter 142A of the rotor shaft 142 such that the lock nut 164 abuts against an axial end face 140A of the gear 140 to secure the gear 140 to the rotor shaft 142. The lock nut 164 limits or otherwise opposes axial movement of the gear 140 relative to the centerline axis A. In an installed position, the bearing assembly 154 is mounted on the outer diameter 142A of the rotor shaft 142 such that the gear 140 is sandwiched between the bearing assembly 154 and the lock nut 164, as illustrated by FIGS. 5-6. An inner diameter 140B of the gear 140 can include a first set of splines 140C that engage with a second set of splines 142C along the outer diameter 142A of the rotor shaft 142 to establish a splined interface, as illustrated by FIG. 6A.

The retainer 168 is positioned relative to the rotor shaft 142 to bias the lock nut 164 against the axial end face 140A of the gear 140. The rotor shaft 142 defines an inner bore 170 extending a distance from an axial end 142B of the rotor shaft 142 along the centerline axis A. The inner bore 170 is dimensioned to at least partially receive the retainer 168 to limit axial movement of the gear 140 and lock nut 164 relative to the centerline axis A.

Figure 7:
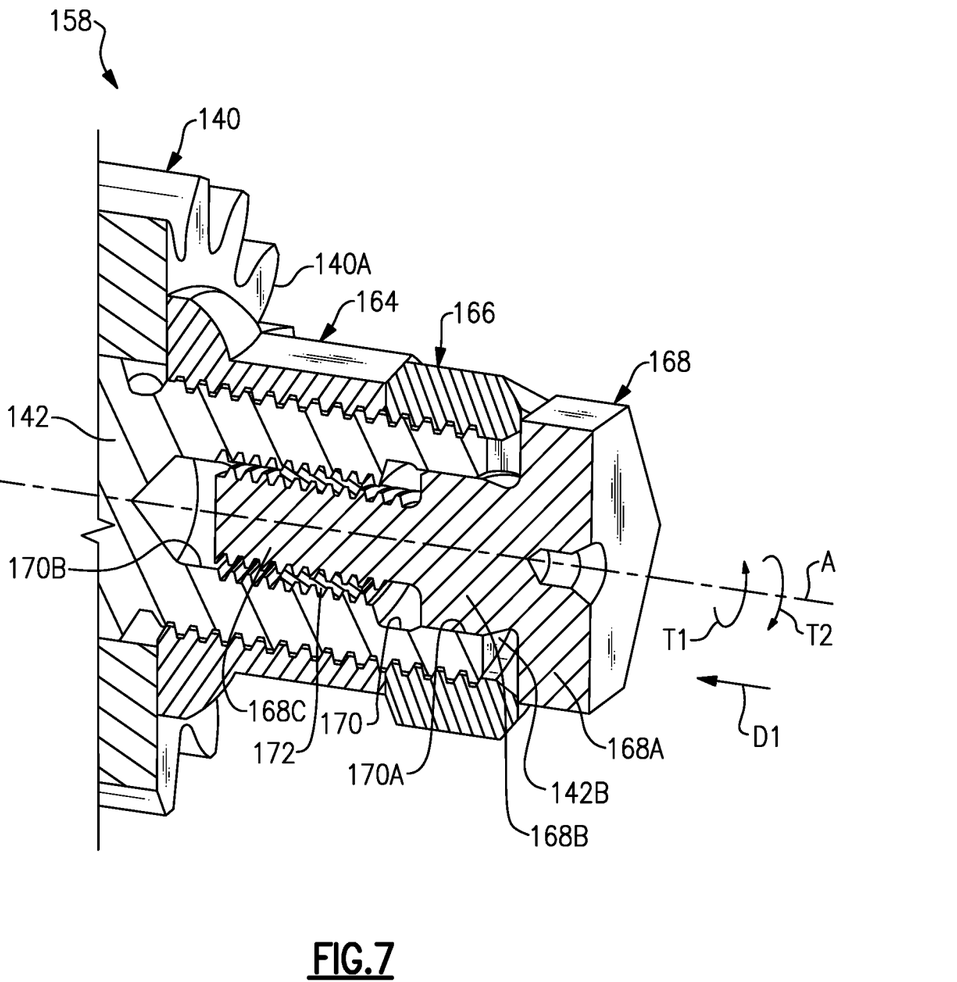
FIG. 7 illustrates selected portions of the locking assembly of FIG. 6.

Referring to FIG. 7, with continuing reference to FIGS. 5-6, in examples the inner bore 170 is a counterbore including a first portion 170A and a second portion 170B. The first portion 170A extends inwardly from the axial end 142B of the rotor shaft 142. The second portion 170B extends inwardly from the first portion 170A. In the illustrative example of FIG. 7, the first portion 170A has a greater diameter than the second portion 170B.

The retainer 168 is generally shaped as a bolt and includes a head portion 168A, a step portion 168B and a projection portion 168C. The head portion 168A has a generally hexagonally shaped geometry for engagement with tools for assembling and disassembling the locking assembly 158. The step portion 168B extends from the head portion 168A. The projection portion 168C extends from the step portion 168B such that the step portion 168B has a greater diameter than both the projection portion 168C of the retainer 168 and the second portion 170B of the inner bore 170.

The projection portion 168C of the retainer 168 is insertable into the second portion 170B of the inner bore 170 to bias the lock nut 164 against the axial end face 140A of the gear 140. In an installed position, the retainer 168 extends axially along the centerline axis A and threadedly engages with the rotor shaft 142 along the inner bore 170.

In the illustrative example of FIG. 7, the projection portion 168C is threadedly engaged with the rotor shaft 142 along the second portion 170B of the inner bore 170 such that the lock nut 164 is biased against the axial end face 140A of the gear 140. The projection portion 168C is threadedly engaged with the rotor shaft 142 along the second portion 170B of the inner bore 170 through a threaded helicoil insert 172. The helicoil insert 172 radially spaces apart the projection portion 168C and walls of the inner bore 170. The helicoil insert 172 can include a lock feature to oppose rotation of the retainer 168 in an installed position. In other examples, a projection portion 268C of retainer 268 directly threadedly engages rotor shaft 242 along inner bore 270 as illustrated by lock assembly 258 of FIG. 9.

The lock nut 164 is threadedly engaged with the outer diameter 142A of the rotor shaft 142 in a first threaded direction T1 relative to centerline axis A. The projection portion 168C of the retainer 168 is threadedly engaged with the inner bore 170 along the second portion 170B in a second threaded direction T2 relative to centerline axis A to fastening the lock nut 164 and retainer 168 to the rotor shaft 142. In examples, the second direction T2 is opposite the first direction T1. For example, the retainer 168 can include left hand threads, and the lock nut 164 can include right hand threads, or vice versa. In other examples, the second direction T2 is the same as the first direction T1.

The step portion 168B of the retainer 168 is dimensioned to establish an interference fit with the rotor shaft 142 along the first portion 170A of the inner bore 170 to oppose axial movement of the retainer 168. The step portion 168B is oversized such that the step portion 168B has a greater diameter than a diameter of the first portion 170A of the inner bore 170. The interference fit causes walls of the rotor shaft 142 to deflect outwardly and applies a frictional torque to the step portion 168B within the inner bore 170 to oppose movement of the lock nut 164 and spacer 166.

Figure 9:
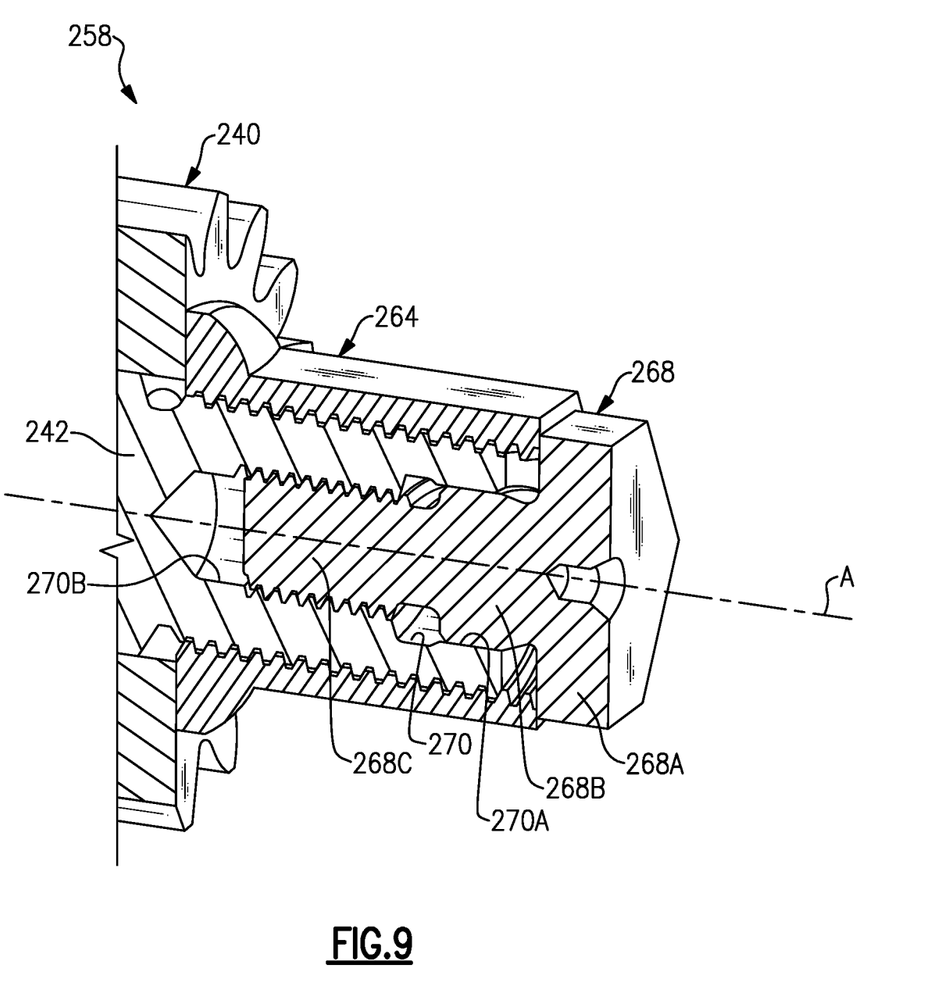
FIG. 9 illustrates a locking assembly according to another example.

The spacer 166 is dimensioned to axially space apart the head portion 168A of the retainer 168 and the axial end 142B of the rotor shaft 142 relative to the centerline axis A. In examples, the spacer 166 is a jam nut. The spacer 166 can be utilized to reduce tolerance mismatches between the components of the locking assembly 158. In the illustrative example of FIG. 7, the spacer 166 is threadedly engaged with the outer diameter 142A of the rotor shaft 142. The spacer 166 is sandwiched between the lock nut 164 and head portion 168A in an installed position. In examples, the spacer 166 is a sleeve that translate along the outer diameter 142A of the rotor shaft 142. In other examples, the spacer is omitted and lock nut 264 is dimensioned to directly abut against head portion 268A of retainer 268, as illustrated in FIG. 9. In some examples, the retainer 168 is dimensioned such that the head portion 168A is received against the axial end 142B of the rotor shaft 142.

Figure 8:
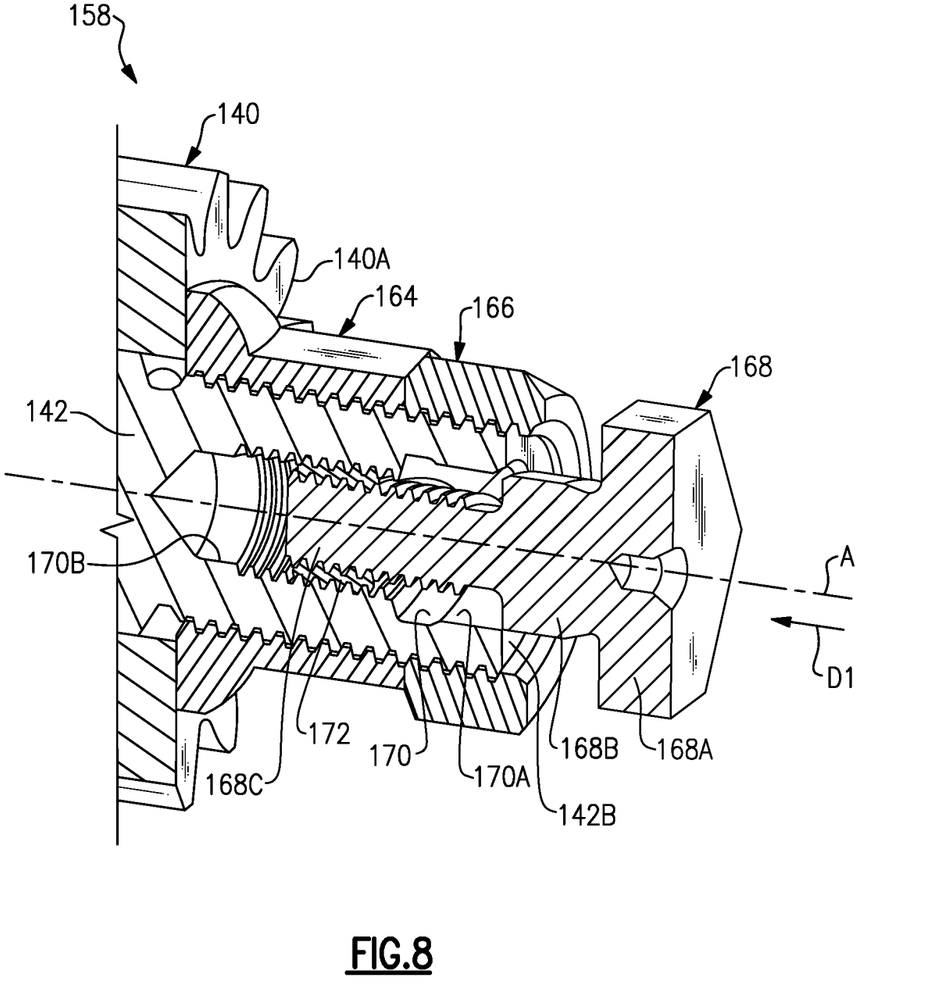
FIG. 8 illustrates the locking assembly of FIG. 7 including a retainer in a partially installed position.

FIG. 8 illustrates the retainer 168 in a partially installed position. Threading of the projection portion 168C engages with the threaded helicoil insert 172. Full thread engagement can occur, with step portion 168B positioned outwardly of the inner bore 170, prior to establishment of the interference fit.

Figure 10:
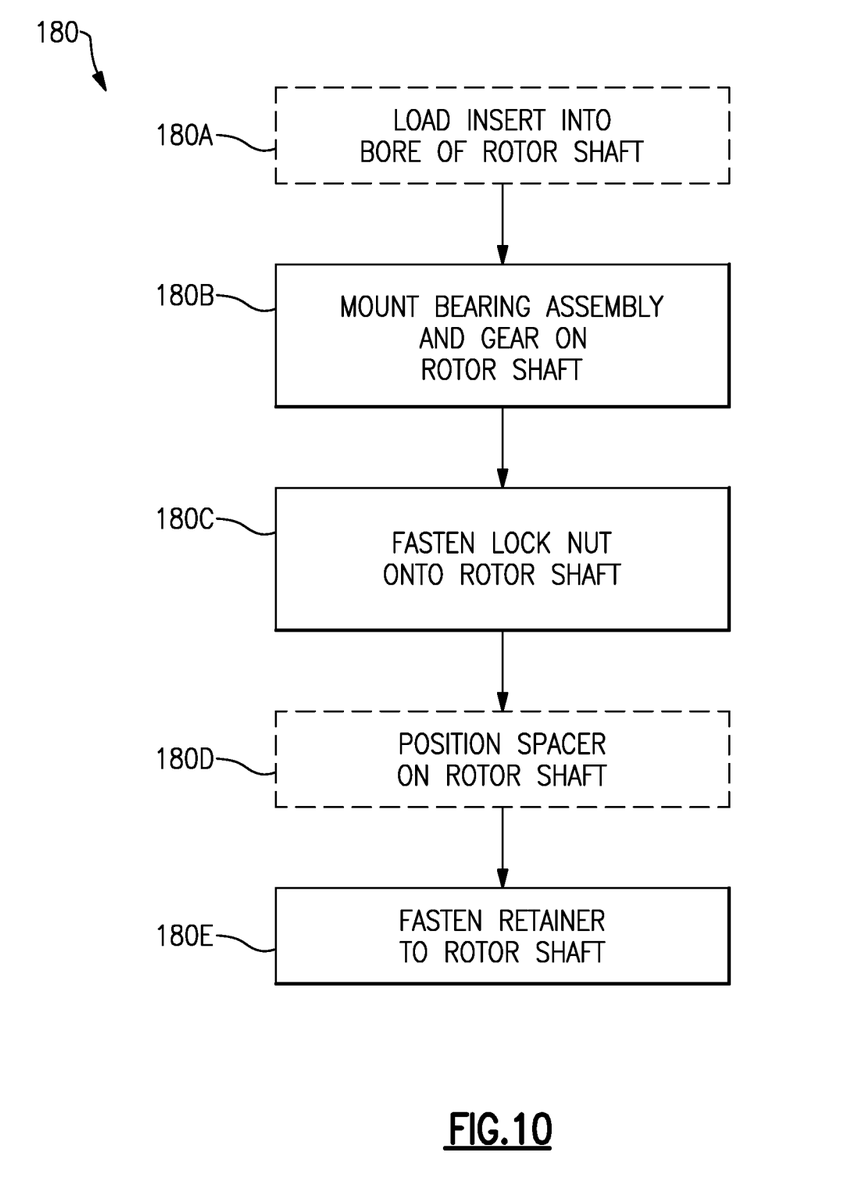
FIG. 10 illustrates a method of assembly for coupling together components.

FIG. 10 illustrates a method of assembly for coupling together static or rotational components in a flow chart 180, such as rotatable components of a starter assembly for a gas turbine engine. Reference is made to the locking assembly 158 of FIGS. 5-8 for illustrative purposes, which can be incorporated into the starter assembly 20 of FIGS. 1-2. The rotor shaft 142 can be coupled to the turbine rotor 28, and the epicyclic gear system 30 can be coupled to the accessory gearbox 36 to drive the gas turbine engine 34 of FIGS. 1-2, for example.

In examples, the method 180 includes loading the threaded helicoil insert 172 into the second portion 170B of the inner bore 170 at step 180A, as illustrated in FIG. 7. At step 180B, the bearing assembly 154 and gear 140 are mounted or received on the outer diameter 142A of the rotor shaft 142, as illustrated by FIGS. 5-6. At step 180C, the lock nut 164 is fastened onto the outer diameter 142A of the rotor shaft 142 such that the lock nut 164 abuts against the axial end face 140A of the gear 140.

In examples, at step 180D the spacer 166 is positioned on the outer diameter 142A of the rotor shaft 142. The spacer 166 can be threadedly engaged with or otherwise fastened to the outer diameter 142A of the rotor shaft 142.

At step 180E, the retainer 168 is fastened to the rotor shaft 142 to bias the lock nut 164 against the axial end face 140A of the gear 140. Step 180E includes threadedly engaging the projection portion 168C of the retainer 168 in the inner bore 170 such that the step portion 168B of the retainer 168 is driven or otherwise moved in a direction D1 (FIGS. 7-8) along the centerline axis A of the rotor shaft 142 to establish an interference fit with the rotor shaft 142 along the inner bore 170, as illustrated by FIG. 7. The threaded engagement overcomes the frictional torque applied by the interference fit to move the retainer 168 along the centerline axis A.

In the illustrative example of FIG. 7, the lock nut 164 is threadedly engaged with the outer diameter 142A of the rotor shaft 142 in the first threaded direction T1, and the projection portion 168C of the retainer 168 is threadedly engaged with the rotor shaft 142 along the second portion 170B of the inner bore 170 in the second threaded direction T2. The directions T1, T2 can be the same or can differ. Threadedly engaging the projection portion 168C can include positioning the threaded helicoil insert 172 between threads along the projection portion 168C and threads along the inner bore 170, as illustrated by FIG. 7. Threadedly engaging the projection portion 168C in the inner bore 170 causes the head portion 168A of the retainer 168 to bias the spacer 166 against the lock nut 164.

The threaded engagement and interference fit established by the retainer 168/268 cooperate with the lock nut 164/264 to provide additional retention of the gear 140/240. The additional retention can reduce a likelihood of the lock nut 164/264 backing off of the gear 140/240 that may otherwise be caused by cyclic loading due to operation of the starter assembly. Incorporation of the retainer 168/268 can also reduce assembly complexity and a likelihood of misbalance.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a coupling together rotatable components comprising:
   a rotor shaft extending along a centerline axis, the rotor shaft defining an inner bore extending from an axial end of the rotor shaft;
   a gear mounted on an outer diameter of the rotor shaft;
   a lock nut threadedly engaged with the outer diameter of the rotor shaft such that the lock nut abuts against an axial end face of the gear; and
   a retainer including a step portion extending from a head portion and including a projection portion extending from the step portion, wherein the projection portion is insertable into the inner bore to bias the lock nut against the axial end face of the gear, and the step portion is dimensioned to establish an interference fit with the rotor shaft along the inner bore.

2. The assembly as set forth in claim 1, wherein the inner bore is a counterbore including a first portion having a greater diameter than a second portion, and the first portion is dimensioned to establish the interference fit.

3. The assembly as set forth in claim 2, wherein the projection portion is threadedly engaged with the rotor shaft along the second portion of the counterbore.

4. The assembly as set forth in claim 3, wherein the projection portion is threadedly engaged with the rotor shaft along the second portion of the counterbore through a threaded helicoil insert.

5. The assembly as set forth in claim 3, wherein the lock nut is threadedly engaged with the outer diameter of the rotor shaft in a first threaded direction, and the projection portion is threadedly engaged with the rotor shaft along the second portion of the counterbore in a second threaded direction opposite the first threaded direction.

6. The assembly as recited in claim 1, wherein the projection portion of the retainer is directly threadedly engaged with the rotor shaft along the inner bore.

7. The assembly as set forth in claim 1, wherein the gear is a sun gear that meshes with a plurality of intermediate gears of an epicyclic gear system comprising the sun gear.

8. The assembly as set forth in claim 1, wherein an inner diameter of the gear includes a first set of splines that engage with a second set of splines along the outer diameter of the rotor shaft to establish a splined interface.

9. The assembly as set forth in claim 1, further comprising a bearing assembly mounted on the outer diameter of the rotor shaft such that the gear is sandwiched between the bearing assembly and the lock nut.

10. The assembly as set forth in claim 1, further comprising a spacer sandwiched between the lock nut and the head portion of the retainer.

11. A starter assembly for a gas turbine engine comprising:
   a rotor shaft extending along a centerline axis, the rotor shaft defining a counterbore including a first portion having a greater diameter than a second portion;
   a turbine rotor rotatable with the rotor shaft;
   an epicyclic gear system including a sun gear, a plurality of intermediate gears and a ring gear, wherein the sun gear is mounted on an outer diameter of the rotor shaft, the plurality of intermediate gears mesh with the sun gear and the ring gear, and the epicyclic gear system interconnects the rotor shaft and an output shaft;
   a bearing assembly received on the rotor shaft axially between the sun gear and the turbine rotor relative to the centerline axis;
   a lock nut threadedly engaged with the outer diameter of the rotor shaft; and
   a retainer including a step portion extending from a head portion and including a projection portion extending from the step portion, wherein the step portion is dimensioned to establish an interference fit with the rotor shaft along the first portion of the counterbore, and the projection portion is threadedly engaged with the rotor shaft along the second portion of the counterbore such that the lock nut is biased against an axial end face of the sun gear.

12. The starter assembly as set forth in claim 11, wherein the output shaft drives an accessory gearbox in response to rotation of the rotor shaft.

13. The starter assembly as set forth in claim 12, wherein the ring gear drives the output shaft in response to rotation of the rotor shaft.

14. The starter assembly as set forth in claim 11, wherein the epicyclic gear system drives the output shaft through a clutch.

15. A method of assembly for coupling together components of a starter assembly for a gas turbine engine comprising:
   mounting a gear on an outer diameter of a rotor shaft, the rotor shaft defining an inner bore extending from an axial end of the rotor shaft;
   fastening a lock nut onto the outer diameter of the rotor shaft such that the lock nut abuts against an axial end face of the gear; and
   fastening a retainer to the rotor shaft to bias the lock nut against the axial end face of the gear, including threadedly engaging a projection portion of the retainer in the inner bore such that a step portion of the retainer is moved along a centerline axis of the rotor shaft to establish an interference fit with the rotor shaft along the inner bore.

16. The method as set forth in claim 15, wherein the gear is a sun gear that meshes with a plurality of intermediate gears of an epicyclic gear system comprising the sun gear.

17. The method as set forth in claim 16, further comprising:
   coupling the rotor shaft to a turbine rotor; and
   coupling the epicyclic gear system to an accessory gearbox to drive a gas turbine engine.

18. The method as set forth in claim 15, wherein the lock nut is threadedly engaged with the outer diameter of the rotor shaft in a first threaded direction, and the projection portion of the retainer is threadedly engaged with the rotor shaft along the inner bore in a second threaded direction opposite the first threaded direction.

19. The method as set forth in claim 15, wherein the step of threadedly engaging the projection portion includes positioning a threaded helicoil insert between threads along the projection portion and threads along the inner bore.

20. The method as set forth in claim 15, further comprising positioning a spacer on the outer diameter of the rotor shaft such that a head portion of the retainer biases the spacer against the lock nut in response to the step of threadedly engaging the projection portion of the retainer in the inner bore.

* * * * *